United States Patent [19]

Kruckemeier et al.

[11] Patent Number: 4,821,851

[45] Date of Patent: Apr. 18, 1989

[54] DAMPER WITH OPTIMIZED ADJUSTABLE VALVING FOR VEHICLE RIDE CONTROL

[75] Inventors: William C. Kruckemeier, Xenia; Gustavus P. Bock, Bellbook; Wayne V. Fannin, Xenia, all of Ohio

[73] Assignee: General Motors Corporation, Detroit, Mich.

[21] Appl. No.: 87,876

[22] Filed: Aug. 21, 1987

[51] Int. Cl.[4] .............................................. F16F 9/34
[52] U.S. Cl. ..................................... 188/319; 188/317; 188/288; 188/299; 188/322.13
[58] Field of Search ............... 188/319, 316, 317, 288, 188/289, 300, 299, 285, 322.22, 322.13, 281, 322.14; 251/78, 129.08, 129.17, 129.19, 149.2; 137/625.32, 614.11

[56] References Cited

U.S. PATENT DOCUMENTS 4,460,074  7/1984  Muller et al. ............... 188/322.14
4,645,043  2/1987  Imaizumi ..................... 188/319

*Primary Examiner*—Andres Kashnikow
*Assistant Examiner*—Mark T. Le
*Attorney, Agent, or Firm*—Charles R. White

[57] ABSTRACT

Suspension damper with double drum variable valving within the confines of the piston which strokes within the damper that is rotatable to predetermined stations in one revolution to provide a wide range of jounce and rebound damping characteristics and rotatable in an opposite direction from any station for maximized valve restriction producing optimized vehicle lift and dive control.

3 Claims, 2 Drawing Sheets

DAMPER WITH OPTIMIZED ADJUSTABLE VALVING FOR VEHICLE RIDE CONTROL

This invention relates to suspension struts and shock absorbers having double-acting dampers for controlling the action of vehicle suspension springs. More particularly, this invention features a damper with new and improved variable valving providing optimized jounce and rebound control and for providing optimized and rapid control of vehicle lift and dive during vehicle braking and accelerating.

In copending U.S. application Ser. No. 059,014, filed June 8, 1987, a selectively variable bypass orifice damper is disclosed in which a selector is rotatably positioned by an actuator to predetermined stations to vary bypass orificing sized to accordingly vary the damping characteristics of the unit. With this valving arrangement, there is selective and effective control of damping of the action of the vehicle suspension springs. With such variable orificing, the damper can be adjusted to suit the operator's requirements or automatically through a control program to match roadway conditions. For example, the damper may be selectively adjusted for maximum flow restriction in the piston valving to provide for a hard ride for sports car performance, for increasing flow through the piston valving for an immediate ride and normal vehicle operation and maximum restriction flow through the valving for soft boulevard type rides.

The present invention is of the general category as the a double-acting hydraulic damper with variable bypass valving of Ser. No. 059,014 but further incorporates new and improved staged double drum bypass valving which provides for a change in orifice size for every station or increment of valve rotation throughout a full revolution in one direction and further provides a quick shut off of the bypass valving by rotation in a reverse direction from one station to the next adjacent station. This one step reversal from any station provides for quick, highly restrictive damping and optimized control over vehicle lift and dive such as might occur when the vehicle is accelerating or decelerating. This invention further features new and improved arcuate routing of fluid through restrictions provided by the valving.

An object of the present invention is to provide a new and improved damper for vehicle suspension springs having selectively variable damping characteristics provided by lost motion valving to select flow routes bypassing main piston valving and housed within the piston that features a plurality of differing flow capacity stations which do not repeat for one complete turn of the valving and which provides for lift dive control by reversal movement of said valving to the next adjacent station from any predetermined station.

Another object of this invention is to provide a new and improved damper for controlling the action of vehicle suspension springs which includes a double drum control valve cooperating with restricted openings in said piston to provide control flow through said piston for flow bypass in parallel with rebound and jounce control valving in said piston for a wide range of damping characteristics.

Another object of this invention is to provide a new and improved damper with a selected range of jounce and rebound controls and having a piston with lost motion bypass valving movable to predetermined stations to vary the orificing and flow routing at any station and to provide for quick highly restrictive orificing for lift and dive control such as might occur during vehicle acceleration or deceleration, i.e. braking.

These and other features, objects and advantages of this invention will ecome more apparent from the following detailed description and drawing in which.

Figure 1:
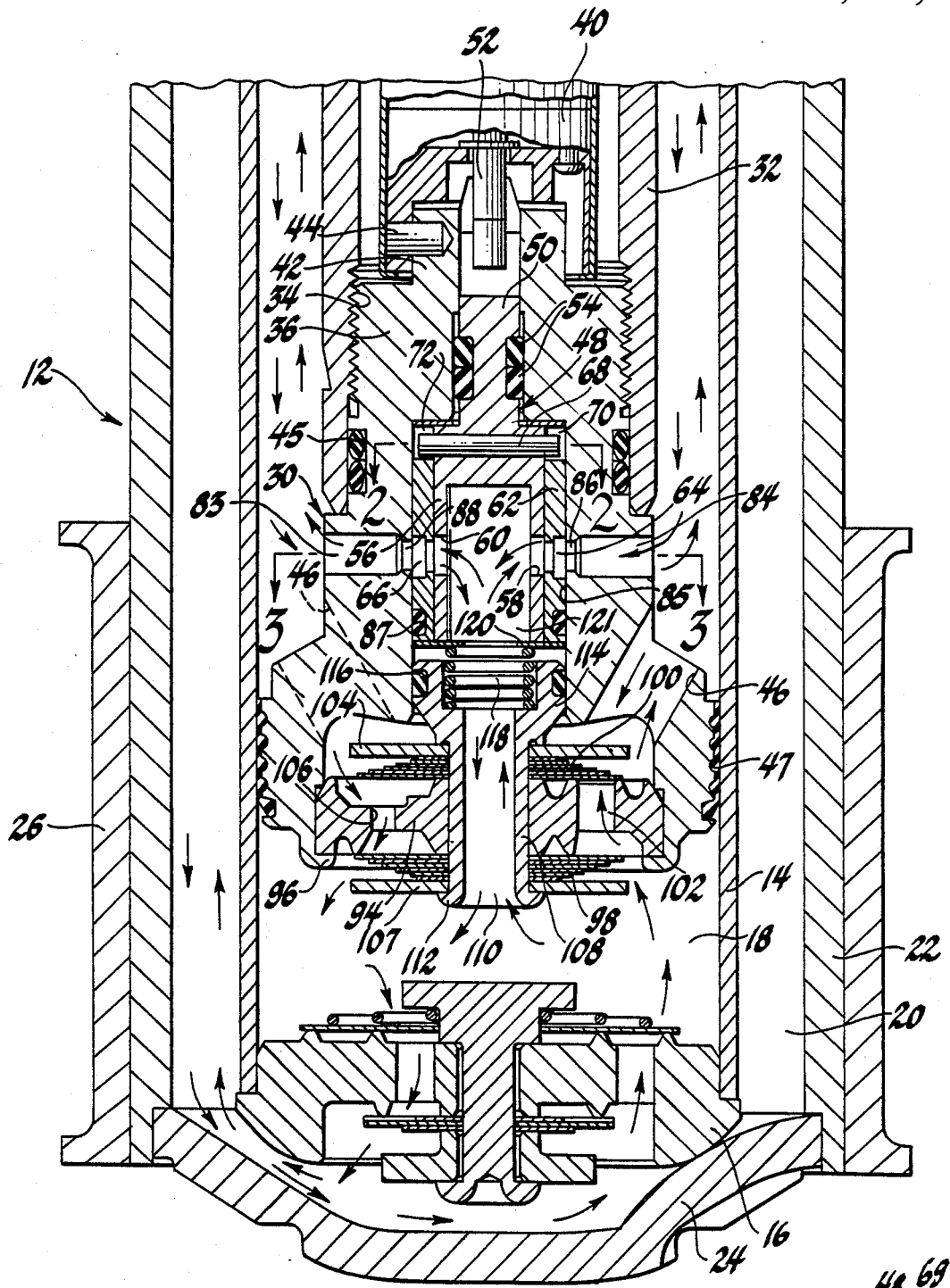
FIG. 1 is a cross-sectional view taken along lines 1—1 of FIG. 2, of a portion of a suspension strut according to this invention.

Turning now in greater detail to the drawings, there is shown in FIG. 1 a lower portion of a suspension strut incorporating a hydraulic double-acting damper 12 adapted to be operatively mounted between sprung and unsprung components of a vehicle. Such mounting is disclosed in U.S. Pat. No. 4,576,258, issued Mar. 18, 1986 to Spisak et al, assigned to the assignee of this invention and hereby incorporated by reference. The strut damper 12 has an elongated cylinder tube 14 having a conventional base valve 16 secured to in a lower end thereof which controls the passage of damper fluid between an inner variable volume chamber 18 of the cylinder tube and a surrounding oil reservoir 20 formed between the cylinder tube and an outer support tube 22.

A valved piston 30 with a connected piston rod 32 provides a piston and rod assembly that is mounted for linear stroking movement in the cylinder tube during damper operations for controlling the action of the vehicle suspension springs. The piston rod 32 is an elongated cylindrical tube that extends upwardly from threaded connection at 34 with the upstanding neck 36 of the piston. From this threaded connection, the piston rod extends upwardly through the upper components of the damper for operative connection with an upper mount such as disclosed in the above-referenced U.S. Pat. No. 4,576,258.

The hollow piston rod provides a housing for an electrically energizeable actuator 40 that has a lower end in the form of a cylindrical wall that fits over the reduced diameter upper end 42 of the neck 36 of the piston and is securely fastened thereto by pin 44. The interior of the piston rod is hydraulically sealed from the fluid within the damper by annular seals 45 disposed between the neck of the piston and the inner wall of the tubular piston rod as shown in FIG. 1.

The piston has a cylindrical main body in the form of a thick wall shell which has upper flow passages 46 therein and which is peripherally bounded by a skirt 47 of a suitable plastics material having low friction sliding engagement with the inner wall of the cylinder tube 14. Mounted for rotational movement within the confines of the neck 36 of the piston assembly is a rotatable driver 48 having an input shaft 50 directly keyed or otherwise connected to the rotatable and downwardly extending output 52 of the actuator 40.

Interior O-ring seals 54 mounted in an annular groove in the input shaft 50 provide an oil block to prevent the damper fluid from entering the interior of the piston rod through the bore provided in the neck 36 for the driver 48.

Figure 3:
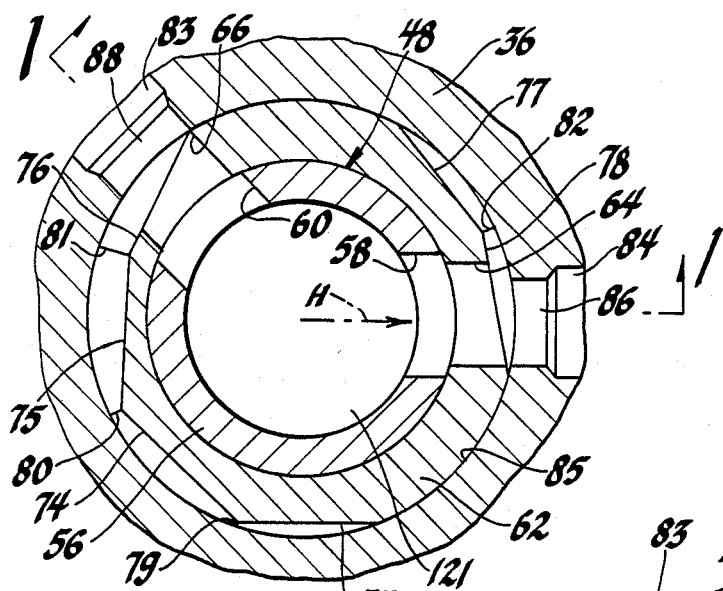
FIG. 3 is a cross-sectional view taken generally along line 3—3 of FIG. 1 showing the bypass valving of this invention is a "home" position.
Figure 4:
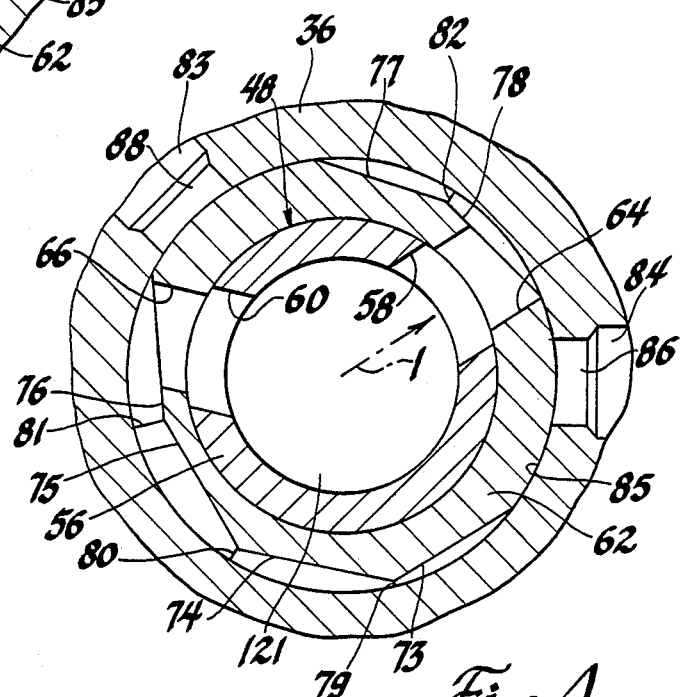
FIG. 4 is a cross-sectional view similar to that of FIG. 3 but showing the bypass valving in another adjusted position.
Figure 5:
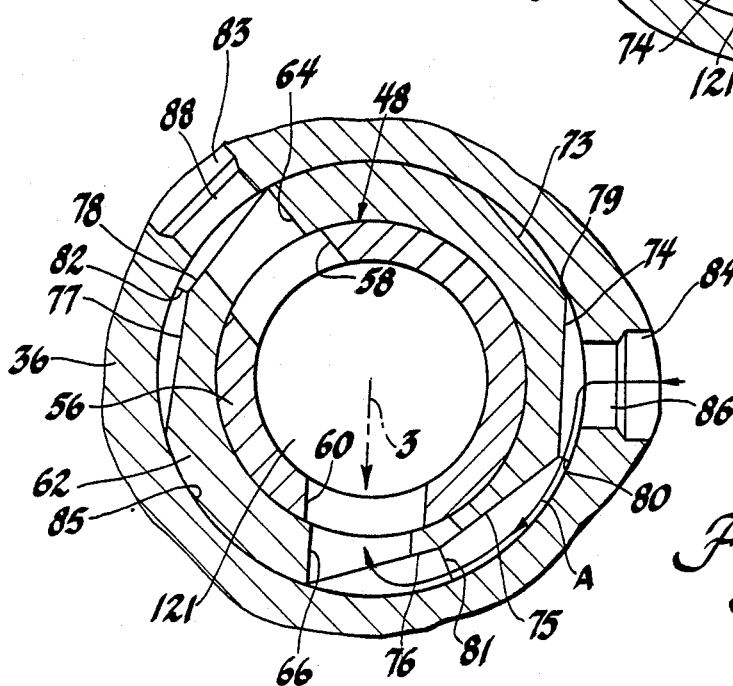
FIG. 5 is a cross-sectional view similar to that of FIG. 4 showing the bypass valving in yet another adjusted position.

The driver 48 has a main body 56, cylindrical in form, with a pair of arcuately spaced flow openings 58 and 60 that have certerlines disposed about 135° from one another as shown in FIGS. 3–5. The body 56 of the driver 48 is operatively mounted within an orifice selector 62 comprising a cylindrical sleeve with fluid metering openings 64, 66 of different capacities and having their centerlines also arcuately disposed at 135° from one another.

Figure 2:
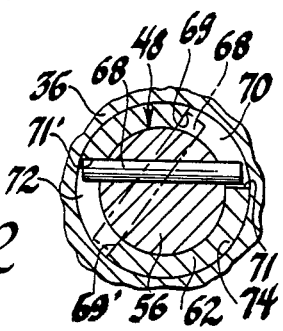
FIG. 2 is a view taken along line 2—2 of FIG. 1.

The driver and selector provide a staged double-barrel, lost motion valve assembly which are connected by a transversely extending drive pin 68. The pin 68 extends through an off-center bore in the body of the selector and then into opposing slots 70 and 72 formed within the upper end of the sleeve that are approximately 55° in arc as shown best in FIG. 2. This construction provides for the lost motion operation of the valve assembly and insures proper assembly of the driver to the selector. This pin, when in a "home" position, contacts vertical end walls 69, 69' of the slots 70, 72 so that counterclockwise rotation of the driver immediately turns the selector 62 and these two parts rotate as a unit. When rotating clockwise from the drive position, the driver turns about 45° before the selector is picked up by the pin 68 contacting end walls 71, 71' of slots 70, 72 respectively. The selector 62 is operatively mounted in a counterbore 85 formed in the neck of the piston 30. O-ring seal 87 seated in an annular groove in the selector 62 frictionally contacts the cylindrical wall of bore 74 to provide sufficient frictional drag so that the driver when reversed to clockwise rotation from any predetermined selected station will not frictionally move the selector clockwise until the drive pin moves through the lost motion arc and engages the walls 71, 71' defining the opposite ends of slots 70, 72. The selector is provided with flats or ramps 73, 74, 75, 76, 77 and 78 which provides different restrictions 79, 80, 81 and 82 between the selector and the inner bore 85 of the neck of the piston 30. These restrictions have been given the values of 1, 2, 6 and 3 units, respectively, to explain the operation of this valving. The neck of the piston has arcuately disposed passages 83 and 84 which can be registered with the restriction or orifices 64, 66 in the selector and 58, 60 in the driver as best shown in FIG. 2. The passages are necked down to provide differing flow restrictions 86 and 88 of different capacities as will be later described.

By rotating the drive and selector plate as a unit to predetermined and selected position by means of the control motor, various combinations of flow control orifices can be chose to set the rebound and jounce damping characteristics of the shock absorber to meet the operator's requirements or computer signals fed into the suspension unts for energizing the actuator 40 for selected degrees of counterclockwise or clockwise turning. As will be pointed out hereinafter, this preferred deisgn has eight different flow restrictions in eight equally spaced stations in one complete rotation. Reversal in counterclockwise direction from any station to the next adjacent station provides highest restriction for left and dive control. If one station has zero flow, this reversal would not open the bypass.

As shown best in FIG. 1, the piston has a shell-like main body that houses an orifice plate assembly that includes a cylindrical relatively thick fixed orifice plate 94. The orifice plate is peripherally secured in the main body of the piston between an inner locator shoulder and an inwardly coined lower annular end 96. A lower valve spring disk pack 98 comprised of a series of flat washer-like valve disks of spring steel having decreasing diameter top to bottom is mounted adjacent to the bottom of the orifice plate to deflect downwardly in response to the forces of jets of hydraulic fluid thereon through passage 106 in rebound stroke (unit extension) to thereby control fluid flow through the orifice plate.

An upper valve spring disk pack 100 similar to disk pack 98 is comprised of a series of flat washer-like valve disks is mounted adjacent to the top of the orifice plate which deflects in response to the force of hydraulic fluid through passages such as passage 102 on compression to provide control of fluid flow through the orifice plate on jounce strokes. The spring disk packs 98 and 100 are held in operative position between upper and lower limit plates 104, 107 by a centralized connector 108 having a flow opening 110 therethrough. The connector has a coined lower end 112 and a cylindrical cup-like upper head 114 shown in FIG. 1. An elastomer O-ring seal 116 blocks the passage of peripheral fluid past the head 114. A helical spring 118 interposed between the head 114 of the connector and a washer 120 contacting the lower end of the driver 48 and selector 62 and opposes the inertia of these parts during damper operation. The main cylindrical body 56 of the driver 48 is hollow as shown to provide an axial passage 121 to passage 110 and the base valving connects passage 110 and chamber 18 to the reservoir 20.

FIG. 3 shows the bypass valving in a "home" position (arrow H) in which the driver openings 58, 60 are aligned with the openings 64, 66 in the selector and 83, 84 in the neck of the piston. If the restrictions 86 and 88 in the piston neck respectively have a value of 12 and 14 units, for example, and the restriction 64, 66 in the orifice plate are, respectively, 14 and 12 units, for example, the total flow orifice would equal 24 units which flows through the driver openings 58 and 60. On rebound, this flow would be through the passage 121, 110 chamber 18 and through the base valve to reservoir 20. Jounce action would effect reversal of this flow. This is parallel flow that would bypass the valve restriction normally provided in the piston and provide for a soft ride. In the event that signals from the operator or from a controller index the driver and the controller together as a unit counter clockwise 45° from the FIG. 3 to the FIG. 4 position which is station I from "home" as indicated by arrow 1. In this position, the selector blocks the openings 83, 84 in the neck of the piston so that there is no flow through the bypass valving. This provides for zero bypass flow and the restriction for flow of damper fluid in jounce and rebound in the piston is provided by the main valving in the piston. This provides for a stiff sports car ride since the suspension spring checking is through the restriction in the main valving in the piston.

This has been found to be desirable in many applications although other intermediate restrictions can be provided as desired. From this first station or any station, the drive and orifice plates can be indexed together at 45° increments counterclockwise to provide a series of varying bypass opening throughout the entire 360° rotary movement. FIG. 5 illustrates movement of the driver and orifice plates together 135° from "home" past a second station, not illustrated, to a third station (arrow 3). This valve staging opens the bypass valving so that jounce and rebound have a secondary and parallel flow path through the piston. On rebound, this third station flow is through radial aligned openings 84, 64 and 38 into passage 121 and through passage 84 past the restrictions 86 and 81 into the axial passage 121 to provide a total orifice opening of sixteen units. Restriction 81 is of no effect since it is larger than restriction 80. This provides for reduced harshness and accordingly softer ride.

In the event that lift and dive control is desired, the driver 48 is rotated one station clockwise from this station or any station relative to the selector as provided by the lost motion pin and slot connection so that the bypass restriction would quickly be the highest available in the unit. This is desirable during vehicle braking for example. The front damper unit would provide resistance to prevent the car from diving and the resistance of rear damper units would be maximized to prevent the vehicle from lifting. Accordingly, this invention provides for improved lift and dive control since this condition would occur from any selected position of the valving.

With this invention, the complete rotation of the valving from "home" through 360° at 45° increments would provide for a total of eight positions and with no two positions providing for the same restriction. From any of these valve positions, a short rotation of 45° of the driver relative to the selector because of the lost motion provided by pin 68 in slots 70, 72 in the clockwise position would shut off the bypass flow for the dive and lift control.

While a preferred embodiment of this invention has been shown and described, other embodiments will become more apparent to those skilled in the art. Accordingly, this scope of the invention is set forth in the following claims.

The embodiments of the invention in which an exclusive property or privilege is claimed are defined as follows:

1. A double-acting damper for controlling the jounce and rebound action of a vehicle suspension spring comprising an outer tube, a cylinder tube mounted within said outer tube and cooperating therewith to form a reservoir for damper fluid contained within said tubes, base valve means operatively mounted at one end of said cylinder tube for controlling the flow between said cylinder tube and said reservoir, a piston rod operatively mounted for reciprocating movement in said cylinder tube extending through the upper end of said damper, a piston secured to the inner end of said piston rod, first valve means in said piston establishing a restricted flow through said piston in jounce and rebound movement thereof, the improvement comprising:

second valve means establishing a second restricted flow through said piston in parallel with said first valve means, said second valve means having first and second valve elements operatively mounted for rotation within said piston and rotatable in one direction as a unit to a predetermined number of distinct steps defining one revolution of said second valve means to provide a different fluid flow rate through said second valve means for each of said steps and being relatively rotatable one adjacent step in an opposite direction from any of said distinct steps to block the flow through said second valve means, said second valve means comprising a dual barrel valve assembly with said first and second vlave elements concentrically mounted within said piston, and a lost device operatively connecting said first and second valve elements providing for relative rotation of said valve elements in one direction from any one of said steps, said first valve element comprising a cylindrical driver and said second valve element comprising a cylindrical selector having a lost motion slot therein, said lost motion device being formed by cross pin means extending through said driver into said slots of said selector.

2. A double-acting hydraulic damper for controlling the action of vehicle suspension springs comprising an outer tube, a cylinder tube mounted within said outer tube and cooperating therewith to form a reservoir for damper fluid, base valve means hydraulically connecting said reservoir to said cylinder tube, a piston and rod mounting for reciprocating movement in said cylinder tube and extending through the upper end of said damper, said piston having a piston plate operatively mounted within said piston, said piston having first valve means operatively mounted on said plate for restricting flow of damper fluid therethrough on jounce and rebound stroke of said damper, the improvement comprising a bore within said piston and first and second staged valve elements nested together and rotatable within said bore to provide a flow path in parallel with said first valve means and further providing flow control orifice means which varies the flow of damper fluid to different flow rates for each of a plurality of predetermined steps ste along the peripheral wall of said bore and which positively blocks parallel flow when said first and second staged valve elements are relatively rotated one adjacent step from any of said predetermined steps and in an opposite direction.

3. The damper of claim 2 wherein said first and second stage valve elements have a lost motion connection therebetween permitting relative rotation of said valve elements for blockage of flow therethrough.

* * * * *